F. I. JOHNSON.
TIRE FOR VEHICLE WHEELS.
APPLICATION FILED JAN. 4, 1915.

1,288,421. Patented Dec. 17, 1918.

Witnesses
R. D. Ibbman.
Penelope Cumberbach.

Inventor
Frederic I. Johnson.
By George H. Kennedy
Attorney

UNITED STATES PATENT OFFICE.

FREDERIC I. JOHNSON, OF FITCHBURG, MASSACHUSETTS, ASSIGNOR TO JOHNSON PNEU-METAL TIRE COMPANY, OF FITCHBURG, MASSACHUSETTS, A CORPORATION OF MASSACHUSETTS.

TIRE FOR VEHICLE-WHEELS.

1,288,421.  Specification of Letters Patent.  Patented Dec. 17, 1918.

Application filed January 4, 1915. Serial No. 500.

*To all whom it may concern:*

Be it known that I, FREDERIC I. JOHNSON, a citizen of the United States, residing at Fitchburg, in the county of Worcester and Commonwealth of Massachusetts, have invented a new and useful Improvement in Tires for Vehicle-Wheels, of which the following is a specification, accompanied by drawings forming a part of the same.

My present invention relates to that class of wheel tires adapted to be used upon vehicles in which it is desired to obviate the jar resulting from the roughness of the roadway, such for example, as automobiles, motor trucks, and the like.

My improved tire is adapted for use upon vehicles in which pneumatic tires are now employed, and it has for its object to secure the resilience due to the use of a pneumatic tire, and avoid the liability of puncture, and also to increase the durability of the tire. These objects, among others, I accomplish by means of the construction and arrangement of parts as hereinafter described, the novel features being pointed out in the annexed claims.

My invention is illustrated in the accompanying drawings, in which—

Similar reference characters refer to similar parts in the different figures.

Figure 1:
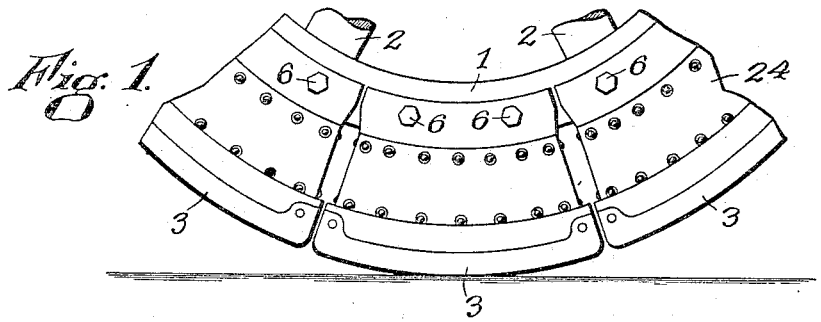
Figure 1 represents a portion of a vehicle wheel provided with my improved resilient tire.

My present invention relates to a tire which is formed in sections and attached to the wheel rim. The sections are duplicates of each other and are slightly separated to allow a freedom of movement to each. In Fig. 1 I have shown a portion of a wheel, consisting of a rim 1, spokes 2, and tire sections 3. The tire sections 3 are represented in sectional view in Figs. 2 and 3, and they consist of a rim plate 4 provided with flanges 5 which inclose the sides of the rim 1 and are attached thereto by bolts 6. Mounted upon the outer side of the rim plate 4 is a tread plate 7, separated from the rim plate 4 by four pairs of springs, each pair consisting of an outer spring 8 and an inner spring 9. Each pair of springs is held concentrically by means of heads 10 which fit concave recesses in the rim plate 4 and tread plate 7, the compression of the spring serving to press the tread plate 7 away from the rim plate. The outward movement of the tread plate is limited by the bolts 11 which are held in lugs 12, 12, projecting inwardly from the tread plate 7, said bolts 11 passing through slots 13 in the side walls 14 of a hollow boss 15 depending from the outer surface of the rim plate 4. The end walls of the hollow boss 15 are provided with convex outer surfaces 16 in contact with plates 17 carried on the free ends of levers 18 pivotally held upon pins 19 in lugs 20 integral with the tread plate 7. The tread plate 7 is provided with a flange 21, provided on opposite sides with holes 22 for the insertion of the bolts 11. The rim plate 4 is provided with a flange 23, with its outer surface in alinement with the outer surface of the flange 21, and to these outer surfaces I attach a flexible covering 24. The springs 8 and 9 are arranged in four pairs or sets, upon opposite sides and equidistant from center lines passing longitudinally and transversely through the outer sections, thereby affording four points of pressure against the tread plate symmetrically arranged in order to produce a uniform pressure to resist the compression of the tire section at any point of its circumference.

The surfaces 16, 16 of the hollow boss 15 are made convex to engage concave surfaces on the plates 17 carried upon the free ends of the levers 18. This form of contacting surfaces facilitates the rocking motion of the tread plate 7 as one or the other of its ends is being compressed. The tread plate 7 is provided with four lugs 25 at the side of and preferably integral with the lugs 20, as shown in plan view in Fig. 3, and corresponding lugs are formed upon the rim plate 4, two of which are shown at 26, Fig. 2. The ends of the lugs 25 and 26 present opposing surfaces which limit the compression of the springs 8 and 9 before their limit of elasticity has been reached.

Figure 2:
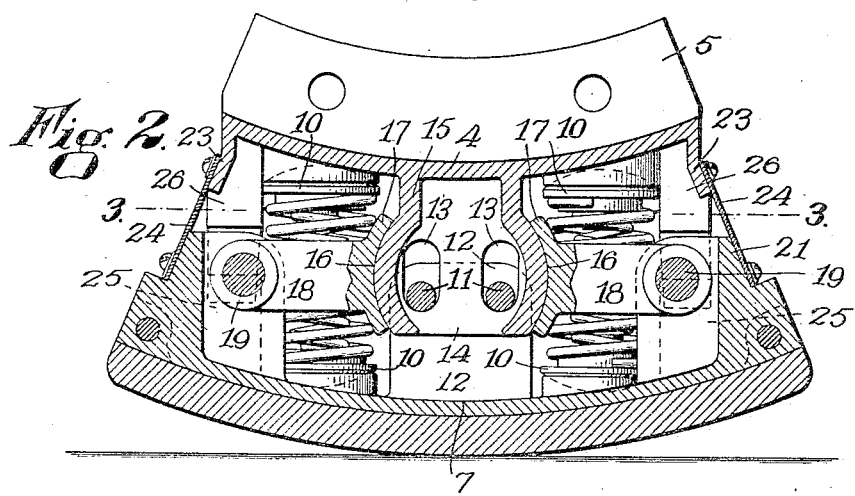
Fig. 2 is a section on a larger scale of one of the sections of my improved tire shown on a plane at right angles with the axis of the wheel.

In the normal position of the tire section the springs while expanded to nearly their fullest extent exert sufficient pressure against the tread plate 7 to hold the flexible covering 24 taut and also to hold the bolts 11 at the bottom of the slots 13, as shown in Fig. 2. In this position the levers 18 are in a straight line, as shown in Fig. 2, with their free ends engaging the convex surface 16 of the hollow boss 15. When the tire section is brought directly beneath the center of the wheel the weight of the load is received by the four pairs of springs which, if the load be sufficient, will be compressed to bring the tread plate nearer the rim of the wheel, causing a slight rocking motion of the levers 18 on their pins 19. The compression of the springs will, however, be limited by the stop lugs 25 contacting with the lugs 26 before the limit of elasticity of the springs has been reached. If radial pressure is brought to bear upon one end of the tread plate as would occur when the tire section was approaching the ground, the two pairs of springs at one end would first be compressed, causing a slight rocking motion of the tread plate about a central transverse axis with which the curved sections 16, 16 are concentric, thereby allowing a slight sliding movement between the surfaces 16 and the concave recesses of the plates 17.

Figure 3:
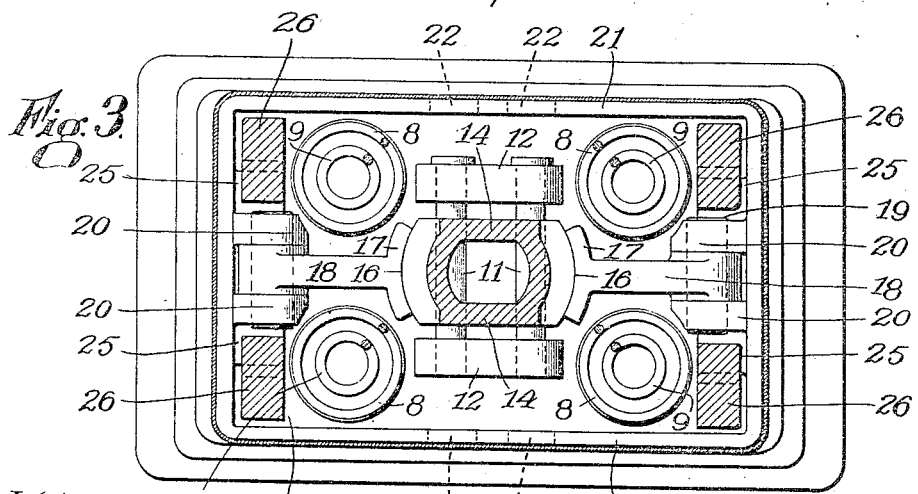
Fig. 3 is a plan view of the tread portion of the tire, the section being taken on the broken line 3—3, Fig. 2.

The lugs 26 extend within the flange 21 of the tread plate at each of its corners, as shown in Fig. 3, in order to prevent any twisting movement of the tread plate about an axis radial to the wheel, such, for example, as might otherwise result from a deflection of the wheel from a straight line in steering the vehicle.

I claim:

1. The combination with a wheel rim, of a rim plate attached to the wheel rim, a tread plate, springs interposed between said rim plate and said tread plate, a lug projecting from the central portion of the rim plate, and a pair of levers pivotally connected with the tread plate near its opposite ends, with their free ends bearing against said lug.

2. The combination with a wheel rim, of a tread plate, a lug carried by the wheel rim and projecting radially outward opposite the center of said tread plate, said lug having convex surfaces on its outer sides, and levers pivoted on the tread plate, with their free ends fitting the convex sides of said lug, whereby the rotative movement of the wheel is imparted to said tread plate.

3. In a tire for vehicles, the combination with a wheel rim, of a tread plate normally concentric with said rim, springs interposed between the wheel rim and the tread plate, means for limiting the outward movement under the expansion of said springs, and means for imparting the rotative movement of said wheel rim to the tread plate, consisting of a lug for each tread plate projecting from the wheel rim, having convex sides, and a pair of levers pivoted on the tread plate at opposite sides of said lugs with their free ends fitting the convex sides of the lugs.

4. In a tire for vehicles, the combination with a wheel rim, a tread plate normally concentric with said rim and having a pivotal connection therewith, interposed springs between said rim and said tread plate, a lug projecting radially outward from said rim, and having convex sides concentric with the pivotal axis of the tread plate, and pivoted members carried by the tread plate and fitting the convex sides of said lug.

5. In a tire for vehicle wheels, a rim plate, a series of spaced tread plates, four springs interposed symmetrically between said rim plate and each of said tread plates, and on opposite sides of the longitudinal and transverse center lines of the tread plate, lugs projecting radially inward from each corner of the tread plates and lugs projecting radially outward from the rim plate and presenting opposing surfaces to said tread plate lugs, but normally spaced therefrom, whereby the rocking motion of the tread plates is limited in all directions.

FREDERIC I. JOHNSON.

Witnesses:
PENELOPE COMBERBACH,
NELLIE WHALEN.